United States Patent
Hacker et al.

(10) Patent No.: US 10,523,016 B2
(45) Date of Patent: Dec. 31, 2019

(54) PHYSICAL ISOLATION BETWEEN MAC AND PHY ETHERNET CONNECTIONS

(71) Applicant: Analog Devices Global, Hamilton (BM)

(72) Inventors: Stefan Hacker, München (DE); Andreas Koch, Wiesbaden (DE); Ralph Patrick McCormick, Haverhill, MA (US)

(73) Assignee: Analog Devices Global, Hamilton (BM)

( * ) Notice: Subject to any disclaimer, the term of this patent is extended or adjusted under 35 U.S.C. 154(b) by 45 days.

(21) Appl. No.: 15/146,616

(22) Filed: May 4, 2016

(65) Prior Publication Data

US 2017/0324251 A1 Nov. 9, 2017

(51) Int. Cl.
*H02H 11/00* (2006.01)
*H02J 4/00* (2006.01)
*G08C 19/00* (2006.01)
*H04B 3/56* (2006.01)

(52) U.S. Cl.
CPC ............... *H02J 4/00* (2013.01); *G08C 19/00* (2013.01); *H04B 3/56* (2013.01); *H04B 2203/5491* (2013.01)

(58) Field of Classification Search
CPC ........................................................ H02J 4/00
USPC ........................................................ 307/326
See application file for complete search history.

(56) References Cited

U.S. PATENT DOCUMENTS

| 7,075,329 | B2* | 7/2006 | Chen | H01F 17/0006 257/531 |
| 2008/0267212 | A1* | 10/2008 | Crawley | H05K 9/0066 370/463 |
| 2009/0327558 | A1* | 12/2009 | Landry | G06F 13/4072 710/301 |
| 2014/0301262 | A1* | 10/2014 | Homchaudhuri | H04W 52/0235 370/311 |

(Continued)

OTHER PUBLICATIONS

"AN-1405 DP83848 Single 10/100 Mb/s Ethernet Transceiver Reduced Media Independent Intertace™ (RMII™) Mode", Application Report SNLA076A, © 2013, Texas Instruments Incorporated, (Oct. 2005), 10 pgs.

(Continued)

*Primary Examiner* — Ryan Jager
(74) *Attorney, Agent, or Firm* — Schwegman Lundberg & Woessner, P.A.

(57) ABSTRACT

An apparatus is provided comprising: a first power domain that includes a first component that operates at a first voltage level; a second power domain that includes a media access controller (MAC) that operates at a second voltage level; and a third power domain that includes a physical media access (PHY) device that operates at a third voltage level; wherein the first voltage level is higher than the second voltage level; and wherein the second voltage level is unreferenced; further including: a first reinforced electrical isolation circuit disposed on a first circuit path that includes at least one signal lane that extends between the first power domain and the second power domain; and a second reinforced electrical isolation circuit disposed on a second circuit path that includes at least one signal lane that extends between the MAC device and the PHY device.

17 Claims, 8 Drawing Sheets

(56) References Cited

U.S. PATENT DOCUMENTS

2017/0111162 A1* 4/2017 Koch ................. H04L 5/14

OTHER PUBLICATIONS

"Analog Devices 5.0 kV rms Quad Digital Isolators", Data Sheet, © Analog Devices, Inc., (2015), 24 pgs.

Cantrell, Mark, "Digital Isolator Simplifies USB Isolation in Medical and Industrial Applications", Analog Dialogue 43-06, (Jun. 2009), 1-4.

Jones, Mike, "Interfacing Fast Ethernet to Processors", [Online]. Retrieved from the Internet: <URL: http://www.micrel.com/_PDF/Ethernet/White%20Paper/Ethernet_to_processors.pdf., Accessed Mar. 19, 2016), 8 pgs.

* cited by examiner

PHYSICAL ISOLATION BETWEEN MAC AND PHY ETHERNET CONNECTIONS

BACKGROUND

Control systems often include electrical isolation to partition the system into multiple power domains. In high voltage systems, isolation barriers isolate control and user interface circuits from dangerous power line voltages so as to block unwanted dangerous voltages across isolation domain barriers to prevent electrical shock to human operators and damage to electrical components, while permitting normal signal and power transfer between isolation domains. Example high voltage systems include industrial automation and control systems such as programmable logic controllers (PLC) and distributed control systems (DCS), inverters, motor drives, medical equipment, solar inverters, power supplies and hybrid electric vehicles (HEV).

A variety of isolation barriers are known, including the use of optical isolators that convert input electrical signals to light levels or pulses generated by light emitting diodes, and then receive and convert the light signals back into electrical signals. Isolators also exist which are based upon the use of Hall effect devices, magneto-resistive sensors, capacitive isolators and coil- or transformer-based (with core or coreless) isolators.

Isolation barriers are used to protect users by safely controlling the flow of power that is supplied from an ac supply to a load based in response to user commands. More specifically, for example, a typical motor drive system may include three power domains: command, control, and power. A safety constraint imposed upon the high voltage system is that the user command circuits must be galvanically isolated from dangerous voltages on the power circuit. In general, a determination is made as to whether to place an isolation barrier between the command and the control circuits or to place an isolation barrier between the control and the power circuits.

FIG. 1 is an illustrative schematic diagram of a motor control system 102 showing electrical isolation between a live power domain 104 and safety-earth power domain 106. Electrical separation of the two power domains is represented by the dashed line 107. The live power domain 104 includes AC voltage supply 108, AC-to-DC converter 109, drive stage 110 and motor 112. The drive stage 110 includes multiple Insulated-Gate Bipolar Transistors (IGBTs) 114 or power MOSFet (Metal Oxide Semiconductor Field effect transistor) configured to convert a DC voltage to a provide a multi-phase, typically three-phase AC drive current provided to the motor 112 coupled as shown. The safety-earth power domain 106 includes control circuit 116 and communication circuits 118. The control circuit 116 produces signals to control operation of the drive stage 110 in response to feedback signals produced by the drive stage 110. The communication circuit 118, which may include local user interface controls such as keyboard and mouse (not shown) or remote control signals through a bus system (not shown), for example, receives user input commands for delivery to the control circuit 116. First control lines 120 are coupled to communicate drive control signals from the control circuit 116 to the drive stage 110. Second control lines 122 are coupled to communicate current feedback control signals from the output of the drive stage 110 to the control circuit 116. Third control lines 123 are coupled to communicate user input commands from the communication circuit 118 to the control circuit 116. First isolation circuits 124 coupled to the first control lines 120 impose a first electrical isolation barrier between the control circuit 116 and the drive stage 110. Second isolation circuits 126 coupled to the second control lines 122 impose a first electrical isolation barrier between the control circuit 116 and output of the drive stage 110. The first isolation circuit includes a separate transformer coupled to each one of the first lines 120 to separate it into two electrically isolated line segments. The second isolation circuit 122 includes a separate transformer in combination with a separate ADC modulator coupled to each one of the second lines 122 to separate it into two electrically isolated line segments.

Different levels of isolation may be provided between different power domains. Systems typically comply with safety requirements defined by international standards such as IEC 61800, IEC 61508 and IEC 62109 that cover applications like motor drives and solar inverters. Safety standards such as International Standard IEC 60950-1 and IEC 60747-17 specify several different electrical isolation levels. Functional isolation is used to enable system components to transmit and receive signals between them while maintaining signal integrity and amplification so that they can function properly. A functional isolation barrier typically does not protect a user from electrical shock. Basic isolation provides an additional second level of isolation to protect from electrical shock. Double isolation provides an additional level of isolation for safety reasons, i.e. twice the basic isolation. Reinforced isolation provides even greater protection from high voltages.

Placement of an isolation barrier between circuits can result in degraded signal integrity, added cost and increase in isolation barrier bulk, requiring additional physical space. As a consequence, a tradeoff often is necessary between the number signal lanes provided between electrical components within different power domains of a system and the level electrical isolation provided between them.

Boundaries between command, control, and power domains are sometimes blurred due to a recent trend to integrate more functions into fewer physically separate components. For example, certain control functions and command functions often are integrated within a common processor device. As a result, fewer physical power domain boundaries may exist within a system at which to locate isolation barriers.

SUMMARY

In one aspect, an apparatus includes a first power domain that includes a first component that operates at a first voltage level, a second power domain that includes a media access controller (MAC) that operates at a second voltage level, and a third power domain that includes a physical media access (PHY) device that operates at a third voltage level. The first voltage level is higher than the second voltage level, and the second voltage level is shifted to the reference level of the third voltage level. A first reinforced electrical isolation circuit is disposed on a first circuit path that includes at least one signal lane that extends between the first power domain and the second power domain. A second reinforced electrical isolation circuit disposed on a second circuit path that includes at least one signal lane that extends between the MAC device and the PHY device.

DESCRIPTION OF EMBODIMENTS

Figure 1:
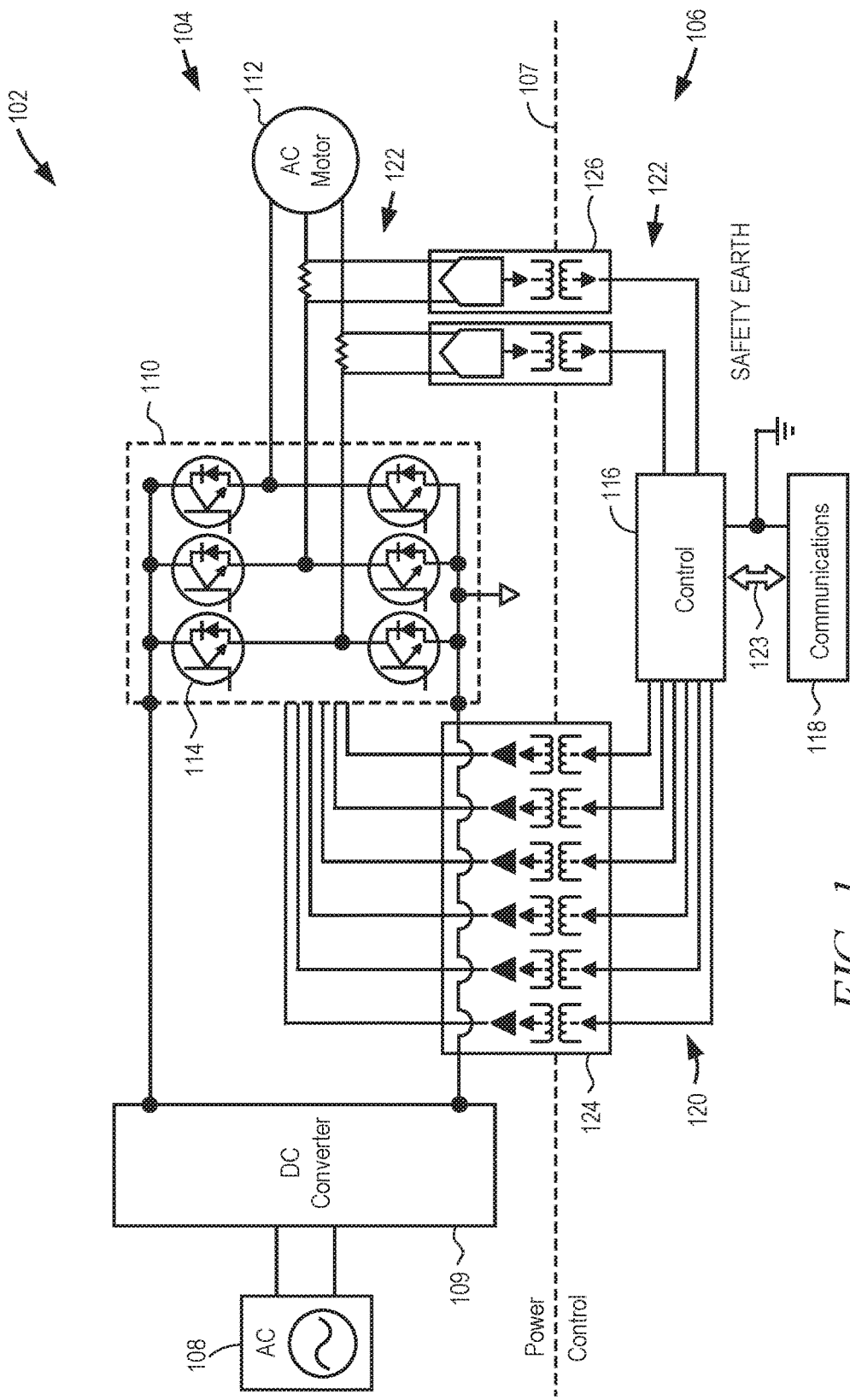
FIG. 1 is an illustrative schematic diagram of a motor control system showing electrical isolation between a live power domain and safety-earth power domain.

The following description is presented to enable any person skilled in the art to create and use a reinforced electrical isolation interface at a data network interface. Various modifications to the embodiments will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Flow diagrams in drawings referenced below are used to represent processes. Thus, the present invention is not intended to be limited to the embodiments shown, but is to be accorded the widest scope consistent with the principles and features disclosed herein.

Figure 2:
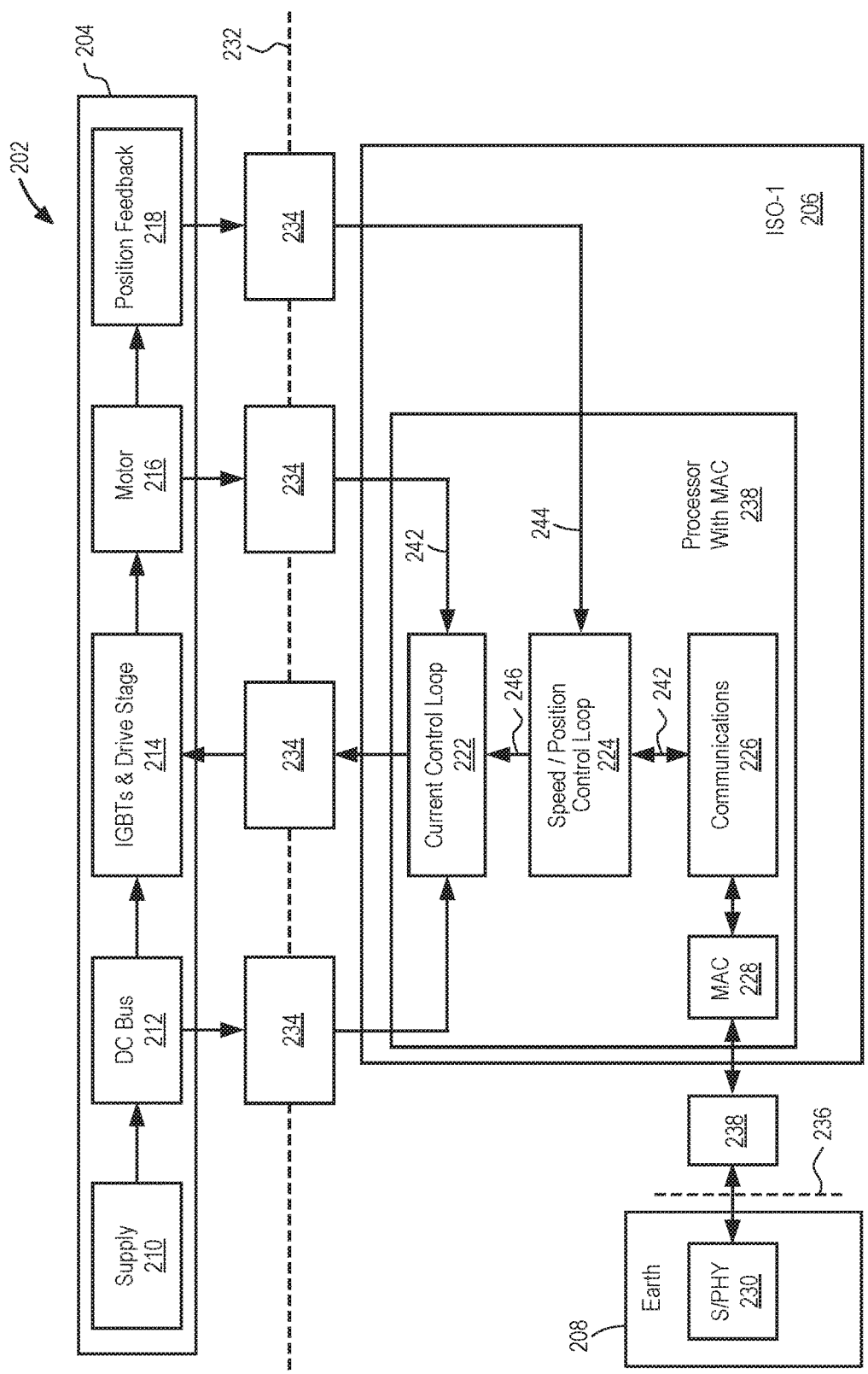
FIG. 2 is an illustrative block diagram of a first motor control system with reinforced isolation in accordance with some embodiments.

FIG. 2 is an illustrative block diagram of a first motor control system 202 with reinforced isolation in accordance with some embodiments. The motor control system 202 includes components disposed within first, second and third power domains 204, 206 and 208, respectively. The first power domain 204 includes components that operate at a higher voltage level, referred to herein the "Live" level: voltage supply 210, DC link/bus 212, drive stage 214, motor 216 and position feedback circuit block 218. In some motor systems, the ac supply voltage can be in a range of 110V-400V or more, for example. The second power domain 206 includes components that operate at a lower intermediate voltage level: a signal processing device and storage device 220 configured to provide a current control loop block 222, a speed/position loop block 224, a communication block 226, and a MAC 228. In some embodiments, the processing device can be implemented in a Field Programmable Gate Array (FPGA) and associated non-transitory storage devices. The third power domain 208 includes components that operate at a low voltage level as base reference level to all other installations, referred to herein as "Earth" potential level: PHY device 230 and network communications cables/backplane. A first reinforced isolation barrier indicated by dashed lines 232 provides electrical isolation between components within the first power domain 204 and components within the second power domain 206. In some embodiments, the first reinforced isolation barrier 232 includes power metal oxide semiconductor field effect transistor (MosFET) or Insulated-Gate Bipolar Transistors (IGBTs) and/or sigma-delta (SD) ADC modulators with isolation transformers represented by blocks 234 for current sense disposed on signal lanes that couple signals between components in the first and second voltage levels. In other embodiments, current sense block 234 is realized by isolated hall sensors or LEM sensors. The first reinforced isolation barrier 232 protects both the electrical components disposed within the second power domain 206 and users who may physically interact with those components from exposure to the higher voltage of used within the first power domain 204.

A second reinforced isolation barrier indicated by dashed lines 236 provides electrical isolation between components within the second power domain 206 and components within the third power domain 208. In some embodiments, the second reinforced isolation barrier 236 includes transformer circuits disposed on signal lanes of a communication interface between the MAC 228 and the (PHY) circuit 230. The second reinforced isolation barrier 236 also provides an additional layer of reinforced electrical isolation between the third power domain 208 and the first power domain 204.

In some embodiments, components in the third power domain 208 operate at one or more different unreferenced voltage levels that between earth and the intermediate voltage level (ISO-1) at which components in the second power domain 206 operate. As used herein, the term "unreferenced" refers to an unknown voltage shift that varies below some maximum level. In some embodiments the maximum unreferenced voltage is up to ~150V, and different components in the third power domain 208 may operate at voltage levels that differ from the intermediate voltage level by anywhere from a few volts to as much as ~150V. This unreferenced voltage shift must be bridged for communication and signal integrity. In some embodiments, the voltage difference is not known. In the past the magnetics 254 discussed below with reference to FIG. 3 in the network interface, discussed below, were sufficient to block these unreferenced voltages. However, for higher voltage control systems such as motor control, the second reinforced isolation barrier 236 is required.

In accordance with some embodiments, for safety in systems that use higher supply voltages greater than 110V range, for example, the first and second reinforced isolation barriers 232, 236 each provides at least 5.0 kV electrical isolation protection.

During normal operation a user may send command signals and receive feedback signals over a network via a network interface that includes the physical layer (PHY) device 230 and the media access controller (MAC) device 228. In some embodiments, a user also may physically touch the communication block 226 within the second power domain 226 to provide input commands through a user interface (UI) 240 such as keyboard or mouse control for example. The communication block 226 exchanges control and feedback signals with the speed/position control loop block 224 on lines 242.

The power supply source 210 provides a power supply signal to the DC power supply link 212. A typical power supply source may provide three-phase ac power supply, which is rectified and provided to the DC power supply bus.

The motor 216 comprises one or multiple large coils for each phase. A magnetic field induced through current applied to the motor coils causes the motor to rotate. The drive stage 214 includes Power MosFET or IGBTs used to chop the DC voltage provided by the DC link 212 to provide a modulated current signal pattern to the motor coils to cause it to turn.

During open loop operation, the motor 216 spins continuously in response to for example PWM modulated control signals applied by the drive stage 214. As the motor turns, a current value feedback signal is provided to the current control loop circuit block 222 to provide an indication of current flow within coils of the motor 212. The current control loop block 222 uses the feedback current value to determine when to instruct the drive stage 214 to adjust the current drive pattern provided to the coils of the motor 212 so as to keep it turning in a continuous fashion. Specifically, the current loop control block 220 provides control information to the drive stage 214 to control the timing of the PWM signals provided to the motor coils.

For precision motion operation, the motor 212 needs to rotate in precise angular increments. The communication block 242 may receive user command signals that specify an amount of angular movement or speed of the motor 212. The position feedback circuit block 218 tracks the angular position of the motor axis during motor rotation and provides a position feedback signal on line 244 to the speed/position control loop block 224. The speed/position control circuit block 224 continuously compares a specified rotational position of the motor 212 to the present angular position of the motor 212 to determine when the motor has reached the specified position or has turned by a specified amount. In response to a determination that the motor 212 has reached the specified position or has turned by the specified amount, the speed/position control loop block 224 provides a signal on lines 246 to the current control loop block 222 instructing it to provide a signal to the drive stage 210 to instruct the drive stage to adjust the drive current provided to the motor 212 so as to stop rotation of the motor or to hold the motor in its present position.

Figure 3:
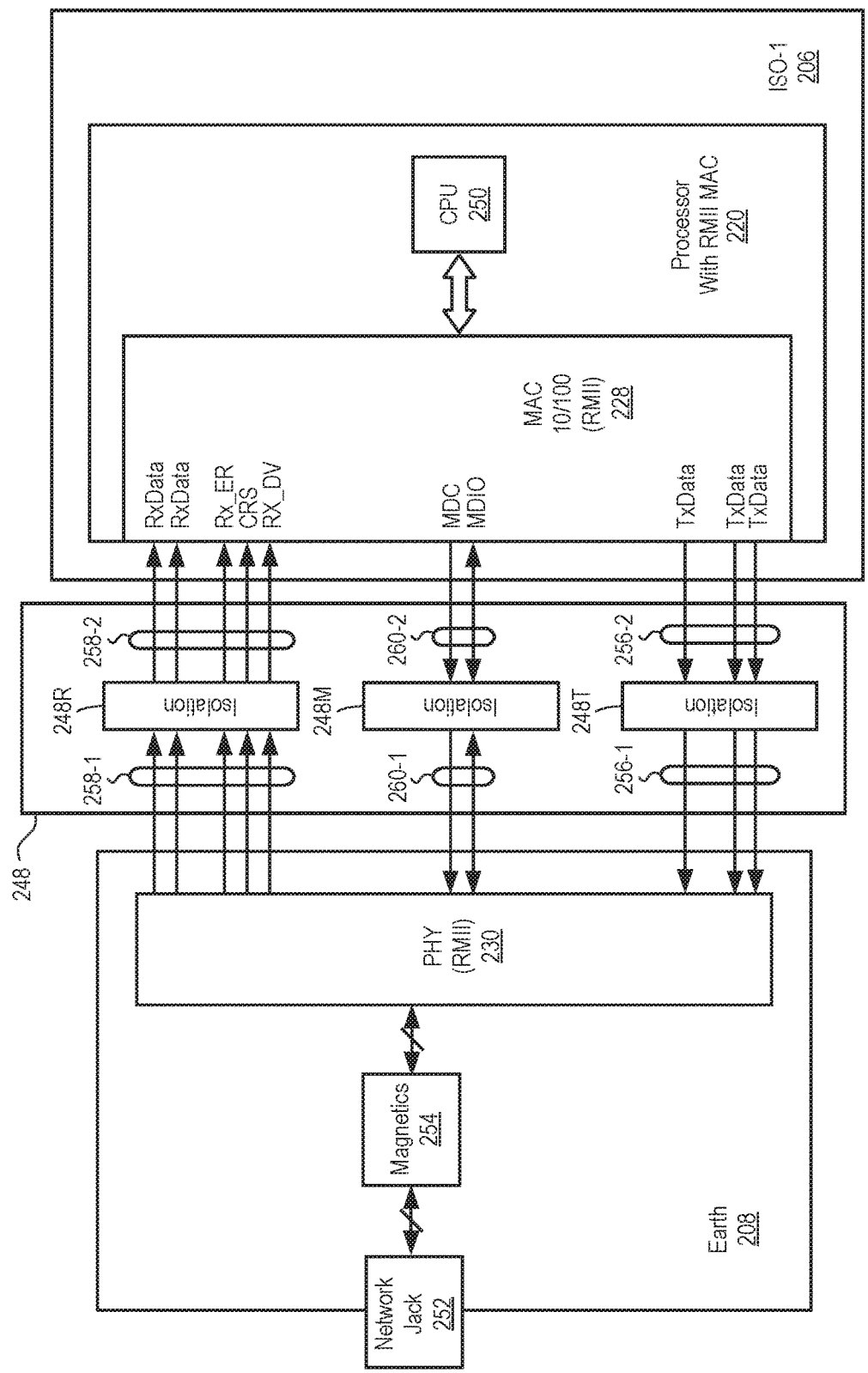
FIG. 3 is an illustrative block diagram showing certain details of the second reinforced isolation barrier of the system of FIG. 2 in accordance with some embodiments.

FIG. 3 is an illustrative block diagram showing certain details of the second reinforced isolation barrier 236 of the system of FIG. 2 in accordance with some embodiments. The second reinforced isolation barrier 236 is disposed between the MAC 228 and the PHY circuitry 230. In some embodiments, a media independent interface (MII) circuit 248 provides media independent communication of signals between the MAC 228 and the PHY device 230. In some embodiments, the network interface is defined in accordance with the IEEE-802.3 Ethernet standard. The second reinforced barrier 236 is disposed within digital communication lanes within the MII 248 that couples the MAC 228 and the PHY device 230.

An Ethernet MAC 228 implements a data-link layer that converts data between packet format for communication with a host processing device and stream of bytes format for communication on a wire or fibre. In some embodiments the MAC and a host processor 250 are integrated onto a single IC 220, such as a microprocessor or a Field Programmable Gate Array (FPGA). It is noted that there is no physical boundary between the host processor 250 and the MAC 228 at which to insert a reinforced isolation barrier. The PHY device 230 acts as a media dependent interface to physical media, which converts binary information between serial data streams suitable for communication on the physical media (e.g., twisted pair copper, coax, fiber optic, etc.) and packets suitable for communication with the MAC 228. A network jack 252 provides physical coupling to the physical medium. A magnetics block 254 includes an impulse transformer acting as isolation-magnetic coupler (not shown) for each network jack connector as required by an IEEE standard isolates and offsets the signal voltage from PHY 230 and from connectors of the network jack 252 to protect the PHY 230 and other devices (e.g., switches) from being damaged by potentially high voltage differences carrier through network. However, the isolation magnetics 254 typically provide lower strength isolation protection in the range 2.0 kV-2.5 kV, which is insufficient protection to protect the network from exposure to higher voltages of the motor control system, for example.

The interface 248 between the MAC 228 and the PHY device 230 includes within it the second reinforced isolation barrier 236, which provides isolation to the pins or lanes on which signals are communicated between the MAC 228 and the PHY device 230. One purpose of an interface 248 is to enable coupling of different versions of the media dependent PHY device 230 for connecting to different media (e.g., twisted pair copper, coax, fiber optic, etc.) to the MAC 228 without the need to change the MAC hardware. Some embodiments of the interface 248 include data signal lanes and management signal lanes between the MAC 228 and the PHY device 230. More particularly, some embodiments of the interface 248 include digital transmit channel data lanes 256 for transmitting from MAC 228 to PHY device 230, digital receive channel data lanes 258 for receiving data by the MAC 228 from PHY device 230, and a station management channel control signal lanes 260 for exchange of control information between the MAC 228 and the PHY device 230 to coordinate and control transmission and receiving of data. In some embodiments, each channel, 256, 258, 260 includes clock, data, and control signals. The number of lanes for data and control provided within the interface 248 involves a tradeoff between number of lanes and latency. A larger number of lanes results in smaller latency. MII versions have been developed for different uses: GMII for gigabit speeds, RGMII for gigabit speeds with reduced lane count, and SGMII for gigabit speeds with serial signals MII, for example. In accordance with some embodiments the second reinforced isolation barrier 236 within the interface 248 is used to impose a reinforced isolation barrier upon transmit lanes, receive lanes and the control lanes that transfer information within the interface 248 between the MAC 228 and the PHY device 230.

In some embodiments, the interface 248 includes a receive interface block 248R, a transmit interface block 248T, and a management control interface block 248M. For example, the interface 248 and the second isolation barrier circuits therein can be integrated into a single device that includes the PHY circuit 230. Alternatively, the interface 248 and the second isolation barrier circuits therein can be integrated into a single device that includes the MAC 228.

Figure 4:
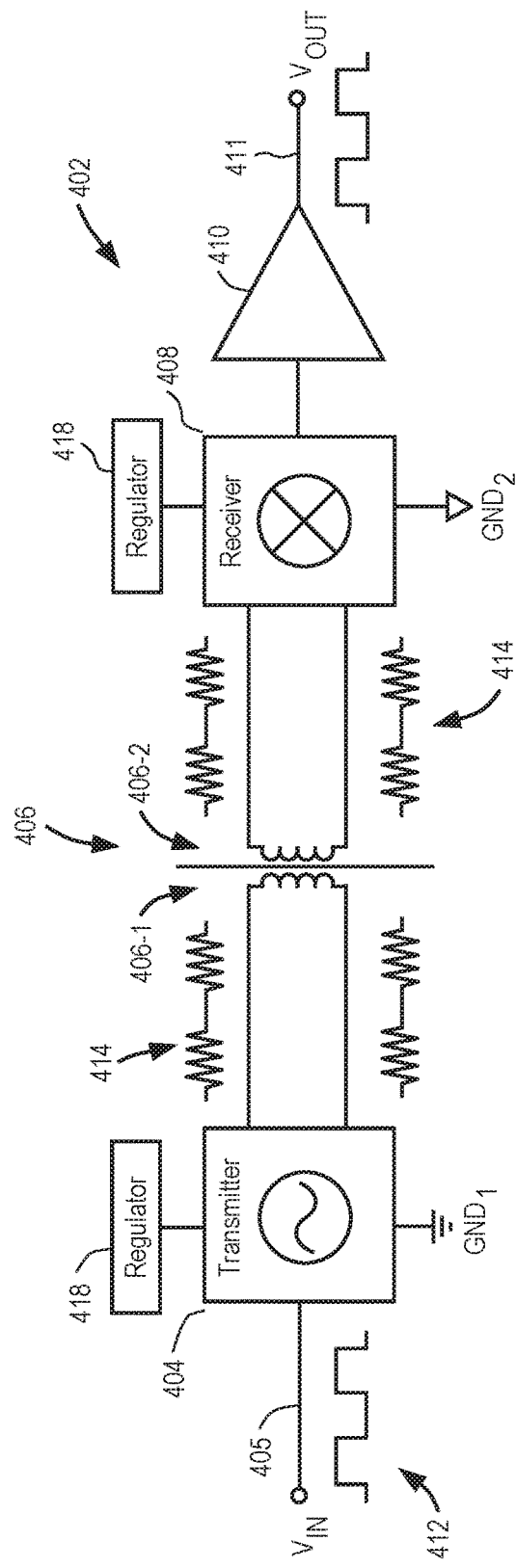
FIG. 4 is an illustrative schematic diagram representing a reinforced lane isolation circuit of the second reinforced isolation barrier of FIG. 3 in accordance with some embodiments.

FIG. 4 is an illustrative schematic diagram representing an individual reinforced lane isolation circuit 402 in accordance with some embodiments. Each lane (256-1, 256-2), (258-1, 258-2), (260-1, 260-2) within each interface block 248T, 248R, 248M includes an individual reinforced lane isolation circuit 402 inserted into it, such that for each individual lane, a first lane segment (256-1, 258-1, 260-1) between the PHY device 230 and the lane's reinforced lane isolation circuit 402 and a second lane segment (256-2, 258-2, 260-2) between the MAC 228 and the lane's reinforced lane isolation circuit 402 provides reinforced isolation on the individual lane within the interface circuit 248 between the PHY device 230 and the MAC 228.

The reinforced lane isolation circuit 402 includes a transmitter circuit 404, a transformer circuit 406, a receiver circuit, and a driver circuit 410. The transmitter circuit 404 is coupled to receive at its input terminal 407 a digital input signal VIN, 412, to convert the received digital input signal 412 to a high frequency analog signal 414 and to provide the high frequency analog signal to a primary winding coil 406-1 of the transformer 406. The transformer 406 magnetically couples the high frequency analog signal 414 from its primary winding coil 406-1 to its secondary winding coil 406-2. The receiver circuit 408 is coupled to receive the high frequency analog signal 414 provided on the secondary winding coil 406-2 and to convert it to a digital form, which is provided to the driver circuit, which provides at its output terminal 411 a corresponding digital output signal $V_{OUT}$, 416. In some embodiments, voltage regulator circuits 418 allow logic and supply voltages to vary over a range of voltages. U.S. Pat. No. 7,075,329 to Chen et al. shows reinforced isolation barrier circuits using micro-transformers in accordance with some embodiments. It will be appreciated that the transmitter input terminal 405 and the driver output terminal 411 each is coupled to a different one of a first or second lane segment within one of the interface blocks 248T, 248R, 248M.

Figure 5:
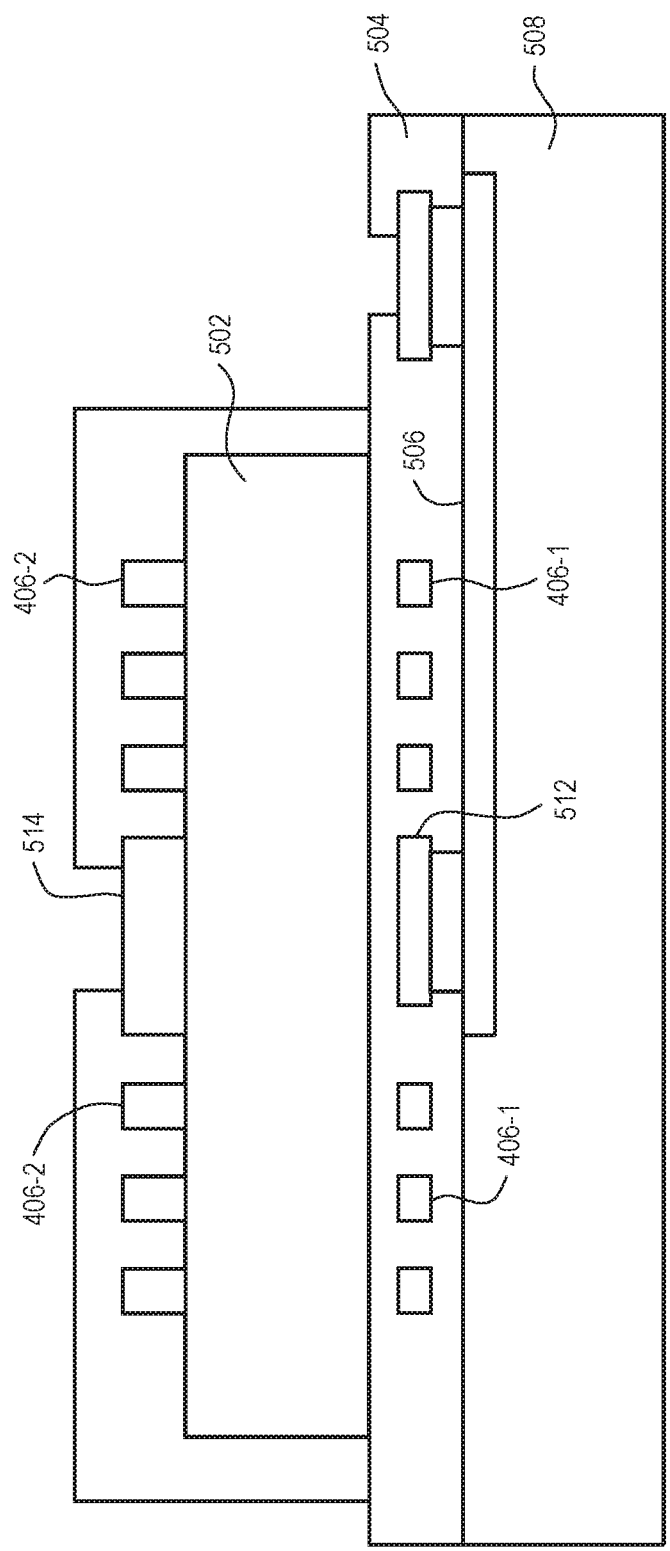
FIG. 5 is an illustrative cross-section diagram of a transformer the individual reinforced isolation barrier circuit of FIG. 4 in accordance with some embodiments.

FIG. 5 is an illustrative cross-section diagram of a transformer 406 of the individual reinforced isolation barrier circuit of FIG. 4 in accordance with some embodiments. The transformer provides galvanic isolation between the digital input signals VIN and the digital output signals $V_{OUT}$ shown in FIG. 4, which are provided on different lane segments of a given lane within the interface 248. An isolation material 502 layer disposed between the primary and secondary winding coils 406-1, 406-2 provides electrical isolation. In some embodiments, the isolation material 502 includes polyimide (PI). In some embodiments, the transformer 406 is a coreless transformer. Outward spiraling metal coils of the first coil winding 406-1 (shown in cross section) are disposed with a passivation layer 504. In some embodiments, the passivation layer includes silicon dioxide. A metal wire 506 within a top-level metallization layer is disposed upon a silicon layer 508 and extends between an electrical contact 510 and a center 512 of the first coil winding 406-1. Outward spiraling metal coils of the second winding 406-2 are physically displaced from the first coil windings 406-1 so as to provide galvanic isolation. The center of the first coil 512 and a center 514 of the second coil 406-2 and corresponding outwardly spiraling coils of the first and second coils are aligned.

The isolation material layer 502 has a sufficient thickness to provide reinforced electrical isolation between a transmitter input terminal 405 that is electrically connected to the primary coil winding 406-1 and a driver output terminal 411 that is electrically connected to the secondary coil winding 406-2. The second coil winding 406-2 is embedded within the isolation layer. In some embodiments in which the working voltage is at or about 550V, an isolation layer that includes a polyimide material that separates the first and second coils by at least 20 μm provides suitable reinforced electrical isolation. The isolation layer is thick enough to block electrical current from punching through it but thin enough to permit magnetic coupling of the high frequency analog signal 414 across it. In other embodiments in which the working voltage is at or about 850V, a polyimide thickness of at least about 30 μm is required to provide suitable reinforced electrical isolation.

The isolation layer thickness required to qualify a barrier as a reinforced isolation barrier depends upon factors such as expected working voltage levels across it, rated lifetime of the system in which it is used and one or more safety factors. For example, IEC 62539, 2007-07 provides examples and statistical methods to analyze times to break down and breakdown voltage data obtained from electrical testing of solid insulating materials for purposes including characterization of reinforced isolation within a system. For example, the standard VDE884-11 provides numerical values (safety margins), which define conditions in which to demarcate isolation as reinforced or basic. In some embodiments, it has been found that there is an approximately linear relationship between isolation material thickness and breakdown voltage with the factor $U_{bmax}$~=800V/m. The other dependency is the lifetime, which depends on the working voltage of a given isolation thickness. Isolations layers generally wear out more quickly when exposed to higher working voltages. Different kinds of isolation materials, such as silicon dioxide and thin film polymer isolators, like including polyimide, have different breakdown voltages and different wear characteristics, and therefore, may require different thicknesses to achieve equivalent isolation protection over the same lifetime.

Figure 6:
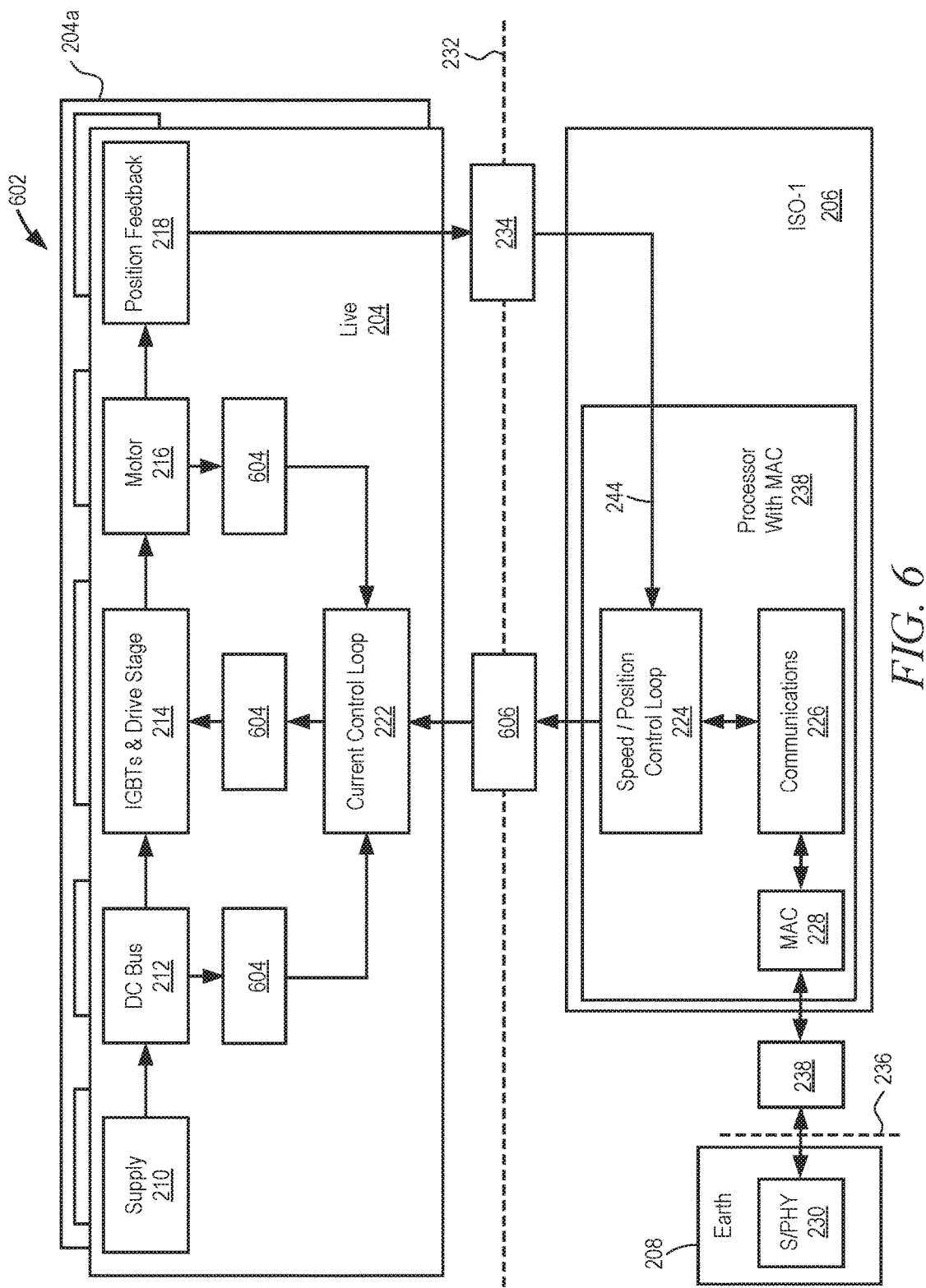
FIG. 6 is an illustrative block diagram of a second motor control system with reinforced isolation in accordance with some embodiments.

FIG. 6 is an illustrative block diagram of a second motor control system 602 with reinforced isolation in accordance with some embodiments. Differences between the first and second motor control systems 202, 602 will be explained. Components of the second motor control system 602 that are the same as those of the first motor control system 202 will not be explained again. In the second motor control system 602, the current control loop circuit block 222 is disposed in the first power domain 204. A first functional isolation barrier indicated by blocks 604, is disposed on signal lanes that couple signals between the current control loop circuit block 222 and the DC link 212, drive stage 214 and motor 216. It will be understood that functional isolation handles situations such as voltage translation from low voltage control circuits to higher voltage drive circuits. Since the current control loop circuit block 222 is in the same power domain as the DC link 212, drive stage 214 and motor 216, functional isolation is sufficient. It is noted that reinforced isolation ordinarily can also handle voltage translation as functional isolation can do. In addition, a reinforced isolation barrier indicated by block 606, which in some embodiments includes SPI or LVDS isolation interface, is disposed on signal lanes that couple signals between the current control loop 222 and the speed/position control loop 224. This isolation barrier is typically designed to the standards of reinforced isolation for high voltage systems. With the placement of the current control loop 222 with the first isolation domain 204, this system architecture allows multi-axis motor control by connecting multiple instantiations of the first isolation domain 204, 204a, etc., to the processor or FPGA on the second isolation domain ISO-1 206. The connections between the speed/position control loop 224 and multiple instances of the current control loop 222, 222a, etc. (only one shown) are handled by the multiple instances of the interface block 606, 606a, etc., (only one shown) disposed on signal lanes that couple signals between components handling the current control loop instances 222, 222a, etc. and the position/speed control loop 224.

Figure 7:
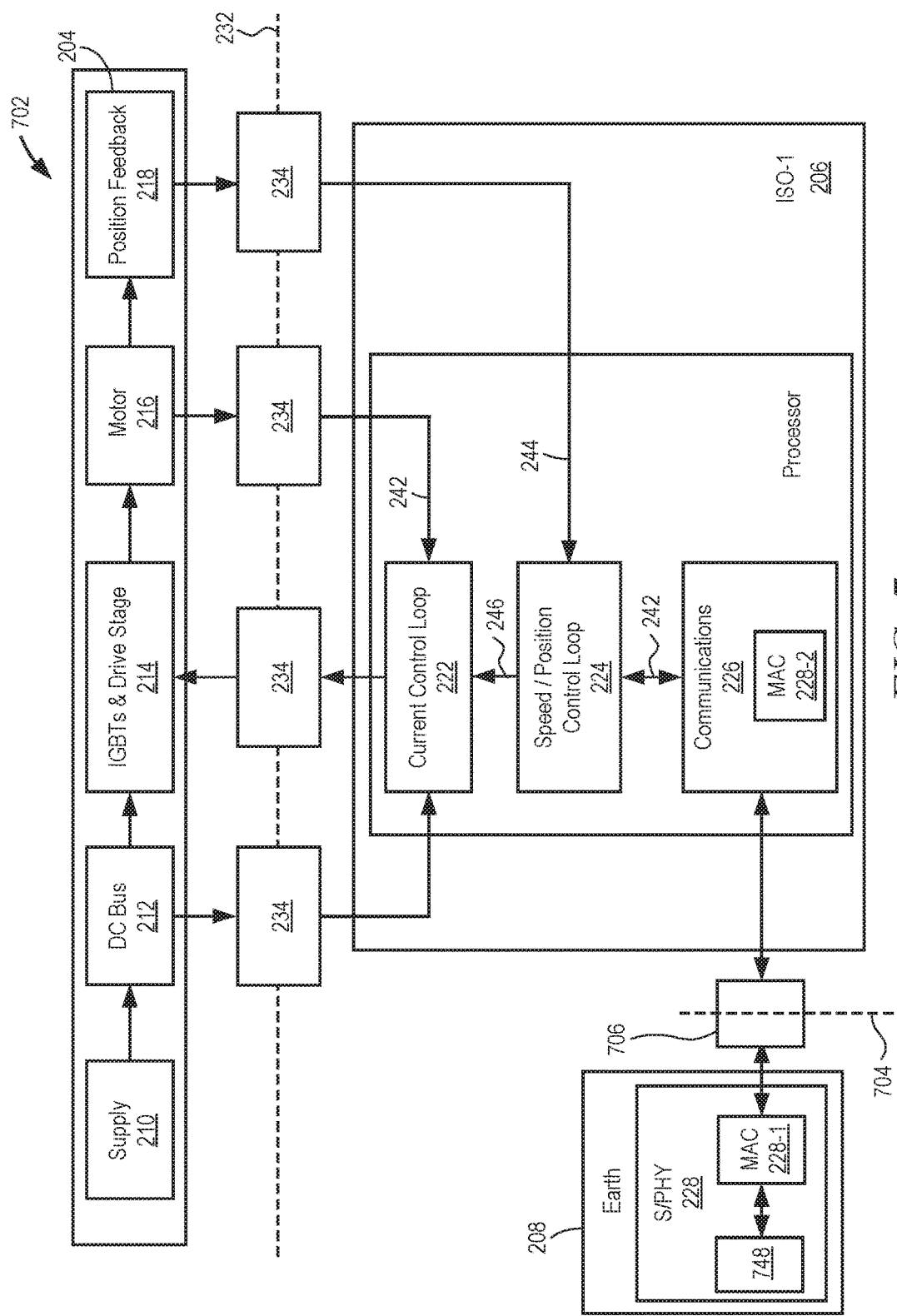
FIG. 7 is an illustrative block diagram of a third motor control system with reinforced isolation in accordance with some embodiments.

FIG. 7 is an illustrative block diagram of a third motor control system 702 with reinforced isolation in accordance with some embodiments. Differences between the first and third motor control systems 202, 702 will be explained. Components of the third motor control system 702 that are the same as those of the first motor control system 202 will not be explained again. In the third motor control system 702, the PHY device or a switching PHY device 230 and a first MAC function circuit 228-1 are disposed within the third power domain 208. A media independent interface 748 is operatively disposed between the PHY device or switching PHY device 230 and the MAC 228-1. A second MAC function circuit 228-2 is integrated within the communication block 226, which is disposed within the second power domain 206. A communication and control channel 704 between the first MAC function circuit 228-1 and the second MAC function circuit 228-2 includes a reinforced isolation barrier 704. In some embodiments, this reinforced isolation barrier 704 includes SPI and/or LVDS isolation represented by block 706 disposed on signal lanes that couple signals between components in the first MAC function circuit 228-1 and the second MAC function circuit 228-2. Other embodiments dispose the two power domains using a circuitry as interface circuit 248 shown in FIG. 3. Reinforced isolation circuitry in SPI and/or LVDS transceivers includes transformers for galvanic isolation together with isolation material layers that are thick enough to provide reinforced isolation as described above.

Figure 8:
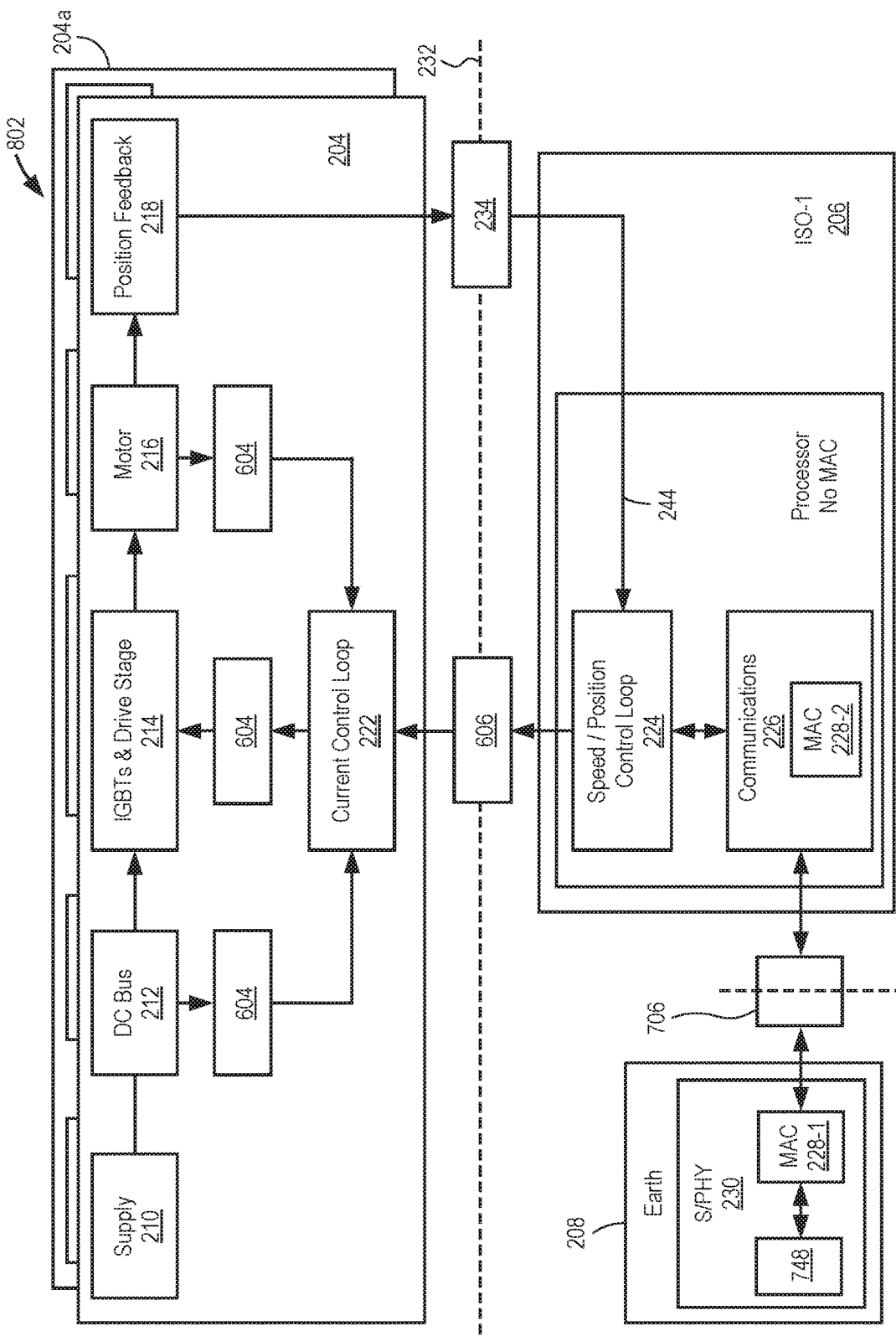
FIG. 8 is an illustrative block diagram of a fourth motor control system with reinforced isolation in accordance with some embodiments.

FIG. 8 is an illustrative block diagram of a fourth motor control system 802 with reinforced isolation in accordance with some embodiments. Differences between the fourth motor control system 802 and the third motor control systems 202, 602, 702 will be explained. Components of the fourth motor control system 802 that are the same as those of the first, second or third motor control systems 202, 602, 702 will not be explained again. Due to placement of the current control loop 222 with the first isolation domain 204, this system architecture allows multi-axis motor control by connecting multiple instantiations of the first isolation domain 204, 204a, etc., to the processor or FPGA on the second isolation domain ISO-1 206. The connections between the speed/position control loop 224 and multiple instances of the current control loop 222, 222a, etc. (only one shown) are handled by multiple instances of the interface block 606, 606a, etc., (only one shown) disposed on signal lanes that couple signals between the components handling the current control loop 222, 222a, etc. and the position/speed control loop 224.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A high voltage system for providing a control signal within a voltage range to a first power domain at a voltage level, the high voltage system comprising:
   a first power domain that includes a first component that operates at the first voltage level;
   a second power domain that includes a media access controller (MAC) device that operates at a second voltage level lower than the first voltage level and a second component that operates at the second voltage level; and
   a third power domain that includes a physical media access (PHY) device that operates to generate a control signal within the voltage range, wherein the voltage range is below a third voltage maximum level;
   a first reinforced electrical isolation circuit disposed on a first circuit path that extends between the first component and the second component, wherein the first circuit path includes at least one signal lane that extends between the first power domain and the second power domain and crosses the first reinforced electrical isolation circuit; and
   a media independent interface (MII) circuit that includes a plurality of signal lanes that extend between the MAC device and the PHY device, the MII circuit comprising a second reinforced electrical isolation circuit disposed on a second circuit path that includes at least one of the plurality of signal lanes that extend between the MAC device and the PHY device and crosses the second reinforced electrical isolation circuit.

2. The high voltage system of claim 1,
   wherein the first reinforced electrical isolation circuit is disposed within the at least one signal lane that extends between the first power domain and the second power domain; and
   wherein the second reinforced electrical isolation circuit includes at least one individual transformer disposed within the at least one signal lane that extends between the MAC device and the PHY device; and
   wherein the at least one individual transformer includes primary and secondary windings that are separated by an electrical isolation material disposed between them that is thick enough to provide reinforced electrical isolation.

3. The high voltage system of claim 1,
   wherein the second reinforced electrical isolation circuit includes a respective reinforced lane isolation circuit disposed within the at least one signal lane that extends between the MAC device and the PHY device;
   wherein respective reinforced lane isolation circuit includes:
   a respective transmitter circuit;
   a respective transformer including a primary winding and a secondary winding; and
   a respective receiver circuit;
   wherein the respective receiver circuit is configured to convert a received digital signal to an analog signal and to provide the analog signal to the primary winding of the respective transformer;
   wherein the respective transformer is configured to magnetically couple the analog signal from the primary winding to the secondary winding; and
   wherein the respective receiver circuit is configured to convert the analog signal coupled to the secondary winding and to convert it to a digital signal; and
   wherein the primary and secondary windings of the respective transformer are separated by a passivation material disposed between them that is thick enough to provide reinforced electrical isolation.

4. The high voltage system of claim 1,
   wherein the first reinforced electrical isolation circuit is disposed within the at least one signal lane that extends between the first power domain and the second power domain; and
   wherein the second reinforced electrical isolation circuit includes a respective reinforced lane isolation circuit disposed within the at least one signal lane that extends between the MAC device and the PHY device;
   wherein respective reinforced lane isolation circuit includes:
   a respective transmitter circuit;
   a respective transformer including a primary winding and a secondary winding; and
   a respective receiver circuit;

wherein the respective receiver circuit is configured to convert a received digital signal to an analog signal and to provide the analog signal to the primary winding of the respective transformer;

wherein the respective transformer is configured to magnetically couple the analog signal from the primary winding to the secondary winding; and wherein the respective receiver circuit is configured to convert the analog signal coupled to the secondary winding and to convert it to a digital signal; and wherein the primary and secondary windings of the respective transformer are separated by a passivation material disposed between them that is thick enough to provide reinforced electrical isolation.

5. The high voltage system of claim 1, further comprising:

wherein the second reinforced electrical isolation circuit includes at least one individual transformer disposed within the at least one signal lane that extends between the MAC device and the PHY device; and wherein the at least one individual transformer includes primary and secondary windings that are separated by an electrical isolation material disposed between them that is thick enough to provide reinforced electrical isolation.

6. The high voltage system of claim 1, wherein the first reinforced electrical isolation circuit is disposed within the at least one signal lane that extends between the first power domain and the second power domain;

wherein the second electrical reinforced isolation circuit includes at least one individual transformer disposed within the at least one signal lane that extends between the MAC device and the PHY device; and wherein the at least one individual transformer includes primary and secondary windings that are separated by an electrical isolation material disposed between them that is thick enough to provide reinforced electrical isolation.

7. The high voltage system of claim 1, wherein the first power domain further includes a motor and a position feedback block;

wherein the first component includes a drive stage coupled to provide a drive current to the motor;

wherein the second component which includes a current control loop block; and wherein the second power domain further includes a speed/position circuit block coupled to receive a position feedback signal from the position feedback block and to provide control signals to the current control loop block; and the high voltage system further including a functional electrical isolation circuit disposed on a fourth circuit path that includes at least one signal lane that extends between the current control loop block and the motor.

8. The high voltage system of claim 1, wherein the second power domain includes a communication block operatively coupled to communicate with the MAC.

9. The high voltage system of claim 1, wherein the third power domain comprises a second MAC device that operates within the voltage range, and wherein at least one of the plurality of signal lanes that extend between the MAC device and the PHY device also extends between the MAC device and the second MAC device.

10. A high voltage system comprising:

a first power domain that includes a first component that operates at a first voltage level and a second component that operates at the first voltage level;

a second power domain that includes a media access controller (MAC) device that operates at a second voltage level lower than the first voltage level and a third component that operates at the second voltage level; and a third power domain that includes a physical media access (PHY) device that operates at a third voltage level that is below a third voltage maximum level;

first isolation means disposed on a first circuit path that extends between the second component and the third component, wherein the first circuit path comprises at least one signal lane that extends between the first power domain and the second power domain; and a media independent interface (MII) circuit that includes a plurality of signal lanes that extend between the MAC device and the PHY devices, the MII circuit comprising second isolation means disposed on a second circuit path that includes at least one signal lane that extends between the MAC device and the PHY device.

11. A method for providing a control signal within a voltage range to a live power domain at a live voltage level, the method comprising:

receiving the control signal from a physical media access (PHY) device of a control power domain, the control signal received at a media access controller (MAC) device of an intermediate power domain, wherein the control signal is received at the PHY device via a media independent interface (MII) circuit that comprises a plurality of signal lanes that extend between the MAC device and the PHY device, wherein the control signal is below a control signal maximum voltage, and wherein the control signal is received across a first reinforced isolation circuit between the control power domain and the intermediate power domain, and wherein the MII circuit comprises a second reinforced isolation circuit disposed on a second circuit path that includes at least one of the plurality of signal lanes that extend between the MAC device and the PHY device; and transmitting the control signal from the intermediate power domain to a first component of the live power domain, wherein the transmitting is across a second reinforced isolation circuit between the intermediate power domain and the live power domain.

12. The method of claim 11, wherein transmitting the control signal from the intermediate power domain to the first component of the live power domain comprises transmitting the control signal across at least one transformer disposed within at least one signal lane that extends between the MAC device and the PHY device.

13. The method of claim 12, wherein the at least one transformer comprises primary and secondary windings that are separated by an electrical isolation material disposed between them to provide reinforced electrical isolation.

14. The method of claim 11, wherein the first reinforced isolation circuit comprises a transformer, and wherein receiving the control signal from the PHY device comprises receiving an induced analog signal at a secondary winding of the transformer.

15. The method of claim 14, wherein the first reinforced isolation circuit further comprises a transmitter circuit and a receiver circuit, and wherein receiving the control signal from the PHY device further comprises:

converting, with the transmitter circuit, a received digital signal to an analog signal;

applying the analog signal to a primary winding of the transformer, and converting the induced analog signal at a secondary winding of the transformer to digital to generate the control signal.

16. The method of claim 11, wherein the first component comprises a drive stage coupled to provide a drive current to a motor of the live power domain.

17. The method of claim 11, wherein the receiving is across a media independent interface (MIT) that comprises the first reinforced isolation circuit.

* * * * *